(12) United States Patent
Meyer et al.

(10) Patent No.: US 8,876,049 B2
(45) Date of Patent: Nov. 4, 2014

(54) SECTION OF AIRCRAFT FUSELAGE IN COMPOSITE MATERIAL WITH A CONSTANT INTERNAL PROFILE

(75) Inventors: Cedric Meyer, Fonsorbes (FR); Jocelyn Gaudin, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 374 days.

(21) Appl. No.: 12/569,215

(22) Filed: Sep. 29, 2009

(65) Prior Publication Data

US 2010/0170988 A1  Jul. 8, 2010

(30) Foreign Application Priority Data

Sep. 30, 2008 (FR) ...................................... 08 56608

(51) Int. Cl.
*B64C 1/06* (2006.01)
(52) U.S. Cl.
USPC ......................................... 244/120; 244/133
(58) Field of Classification Search
USPC .............................. 244/119, 117 R, 133, 120
See application file for complete search history.

(56) References Cited

U.S. PATENT DOCUMENTS

| | | | |
|---|---|---|---|
| 4,463,044 A | | 7/1984 | McKinney |
| 6,114,050 A | * | 9/2000 | Westre et al. ................. 428/608 |
| 6,286,785 B1 | | 9/2001 | Kitchen |
| 2002/0056788 A1 | | 5/2002 | Anderson |
| 2006/0060705 A1 | * | 3/2006 | Stulc et al. .................... 244/119 |
| 2007/0095982 A1 | | 5/2007 | Kismarton |
| 2007/0108347 A1 | | 5/2007 | Sankrithi |

* cited by examiner

*Primary Examiner* — Brian M O'Hara
(74) *Attorney, Agent, or Firm* — Greer, Burns & Crain Ltd.

(57) ABSTRACT

The disclosed embodiments concern an aircraft fuselage section made of composite material with an internal skeleton having frames that form the radial structure of the fuselage and stringers that form the longitudinal structure of said fuselage, and a skin made of composite material, surrounding the internal skeleton, with said skin having an evolving thickness along a longitudinal axis X, with an approximately constant, regular interior profile. The disclosed embodiments also concern a process for manufacturing the skin of an aircraft fuselage section made of composite material, having a draping operation for strips of fibers precoated with resin around a mold, with the number of strips of fibers varying longitudinally depending on the area of the fuselage being considered so as to create a skin with an evolving thickness.

8 Claims, 3 Drawing Sheets

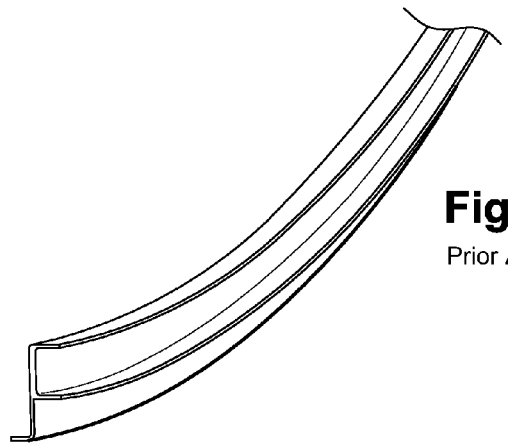
Fig. 5
Prior Art
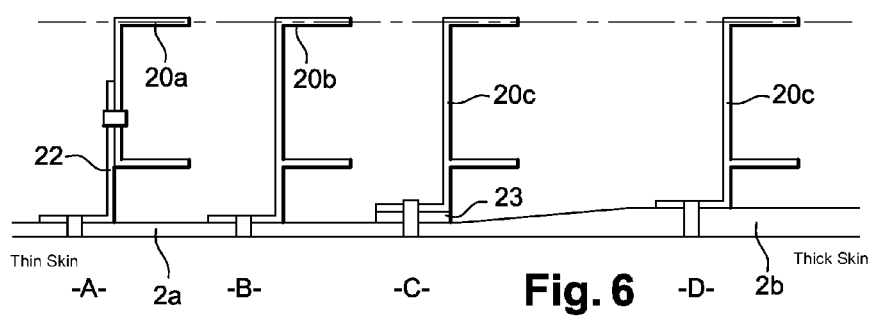
Fig. 6
Prior Art
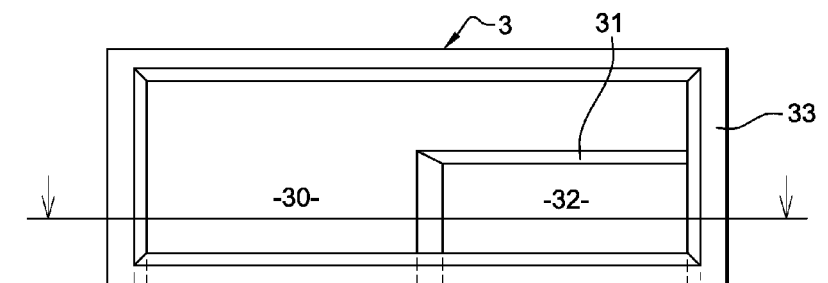
Fig. 7
Prior Art
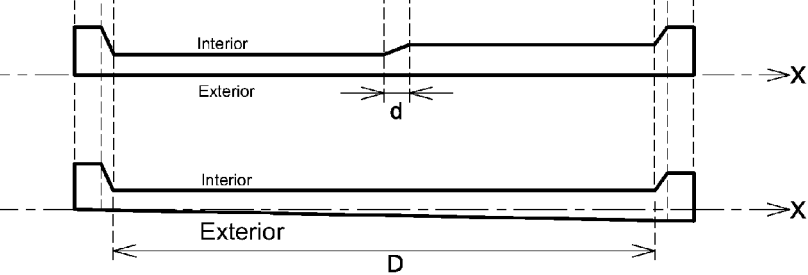
Fig. 8
Prior Art
Fig. 9

SECTION OF AIRCRAFT FUSELAGE IN COMPOSITE MATERIAL WITH A CONSTANT INTERNAL PROFILE

This application claims priority to French Application No. 08 56608 filed 30 Sep. 2008, the disclosures of which are incorporated herein by reference in its entirety.

BACKGROUND

The aspects of the disclosed embodiments concern an aircraft fuselage section made of composite material having an approximately constant internal profile along the longitudinal axis of the aircraft. The disclosed embodiments also concern a manufacturing process for a skin made of composite material for such a fuselage section.

The disclosed embodiments have applications in the field of aeronautics, particularly the field of constructing fuselage sections made of composite material.

Traditional aircraft fuselages are metal. A metal fuselage is comprised of metal panels mounted and attached around an internal structure, which is also metal, called the internal skeleton of the aircraft. Once assembled, these metal panels form the skin of the aircraft. Such metal fuselages have the disadvantage of being heavy, since the internal structure and the skin are metal.

To reduce the weight of the fuselage, aeronautics manufacturers have replaced certain metal elements with elements made of composite material. Composite materials are mainly used to make the skin of the aircraft fuselage. This skin of composite material is made from strips of dry fibers or fibers impregnated with a thermosetting resin. For example, strips of pre-impregnated fibers are placed on/in a mold to be formed, then heated with the mold. The heat causes the resin to polymerize, which allows the fiber reinforcement to take the shape of the mold. After it cools, the mold is removed.

Whatever the type of fuselage, metal or composite material, an aircraft is subject to aerodynamic forces in flight. The aerodynamic forces on the wing section of the aircraft cause flexure of the fuselage. This flexure is proportional to the proximity of the wing root section. The farther the fuselage area in question is from the wing root section, the less flexure. The flexural torque is even close to zero in the nose of the aircraft. On the other hand, in the tail of the aircraft, the flexural torque is never zero due to the presence of the horizontal plane, which generates aerodynamic forces.

An example of an aircraft with the traditional shape is shown in FIG. 1, with the profile of the flexural torque for the aircraft when it is in flight superimposed. This figure shows that the maximum flexural torque My is located at the root of the wing section.

Logically, there is a variation in the thickness of the fuselage skin that corresponds to the profile of the flexural torque My of the fuselage. Thus, the thickness of the skin increases from the nose of the aircraft up to the wing root section, and then decreases from the wing root section to the tail of the aircraft.

FIG. 2 shows the aircraft in FIG. 1 with the different forces corresponding to this flexural torque My exerted on the fuselage. More specifically, the flexural torque My causes tractive stress $F_T$ on the top 10 of the fuselage, i.e., on the top panels of the fuselage. It causes compressive stress FC on the bottom 11 of the fuselage; the bottom includes all of the lower panels of the fuselage, opposite the top and facing the ground. The torque My causes shearing stress T, or torsional moment on the side panels 12 of the fuselage.

To ensure better resistance against these stresses, the skin of the aircraft is reinforced at the panels most stressed. The thickness of the aircraft skin is therefore irregular.

It is also known that a stiff structure makes it possible for more tractive forces than compressive forces to pass for the following reasons:
the characteristics of the composite materials used to make the fuselage are better in traction and
once the skin has shrunk due to the compressive stress, the working width is reduced.

Consequently, to take this characteristic into account, the thickness of the fuselage covering, i.e., the skin, gradually increases from the top 10 to the bottom 11. For example, the skin on the top goes from 1.4 to 1.6 mm in 10 interframes (one interframe equals 533 mm) and the skin on the bottom increases from 2 to 2.8 mm in 20 interframes (an interframe is still equal to 533 mm). An example of the skin thickness is shown in FIG. 3. FIG. 3 shows a curve C10 for the thickness of the skin on the top and a curve C11 for the thickness of the skin on the bottom. The change in skin thickness from top to bottom is gradual and follows the profile of the flexural torque My.

On a traditional, i.e., metal aircraft, the changes in skin thickness are made by machining pockets. For this, sheet metal with the maximum thickness is used, i.e., its thickness corresponds to the maximum thickness of the skin on the bottom. Then, more or less deep pockets are machined, chemically or mechanically, depending on the skin thickness desired.

Such a technique makes it possible to obtain fuselage panels of variable thickness based on the location of said panels on the fuselage. With this technique, the variation in thickness is on the internal profile of the fuselage. For aerodynamic reasons, the sheet metal designed to form the fuselage panels is machined on its inside, that is, on the side of the panels located in the interior of the fuselage. It can therefore be seen that the internal profile of the fuselage is not constant; it can vary in proportion to the variation in the thickness of the skin.

Now, this variation in the internal profile of the skin causes problems attaching the frames and stringers forming the internal structure of the fuselage. It will be recalled that, in an aircraft, the structural elements that form the skeleton, or internal structure, of the aircraft require the use of additional pieces to improve the mechanical hold of these structural elements. These additional pieces can be stiffeners. Stiffeners are profiled pieces attached to the structural elements of the aircraft, for example, panels, to transfer loads or stabilize elements. Stiffeners can be frames, which are radial structural elements of the fuselage or stringers, which are longitudinal structural elements of said fuselage. The frames and the stringers are used particularly to stiffen the skin and stiffen certain specific areas of the aircraft, such as the door frames. The stiffeners, frames or stringers, can have different shapes: for example, a Z, T, J or Omega shape. To offset the variation in the internal profile of the fuselage, shims or wedges are placed under the stringers or frames at the places where the pockets are the largest, and thus where the skin is least thick, to allow stringers and frames of the same size to be attached.

FIG. 11 shows an example of a fuselage panel 13 to which are attached stringers 14 and frames 15. In this example, the stringers have an Omega shape, and the frames are Z-shaped attached with clips 16.

In the case of a fuselage made of composite material, there is no wedge under the stringer or frame. In fact, the draping of the strip of fibers is too complex and too expensive to allow wedges just at the sites of the frames and stringers. It would be possible to consider putting wedges under the stringers and frames by a process of locally superimposing strips of fibers called "the pad-up process," but the mechanical performance of such superimposing would be very poor, because it would be done without interlacing the plies.

In addition, the rules for ply drop-off of composite material are difficult, or even impossible, to apply to the intersections between stringers and frames.

In composite material technology, variations in skin thickness can be made by a process of ply drop-off. In this process, the variations in thickness are obtained by varying locally the number of strips of fibers superimposed by interleaving and offsetting said strips of fibers. As shown in FIG. 4, strips of fibers of different sizes are interleaved between strips of fibers of maximum sizes to create interlaced plies. These plies make it possible to vary the thickness of the skin.

However, this ply drop-off process is slow and difficult (many ply stops and starts). What is more, with such a process, the cost of manufacturing the fuselage is directly connected to the number of variations in thickness. In effect, if a ply drop-off is being made in the longitudinal direction of the aircraft, i.e., a jump in thickness, on the stringers, the stringers must be plunged or sloped so each stringer can be attached according to the profile of the jump in thickness. Then the stringers cannot be produced by pultrusion. Remember that the pultrusion manufacturing process is a process of manufacturing stringers continually, with the stringers being cut later to the desired length. Such a process has the advantage of being inexpensive, since all the stringers produced are identical; however, this process requires that the stringers have a constant cross section. If the inside of the skin has ply drop-offs the dimension of the stringers must necessarily be variable. Therefore, pultrusion cannot be used to produce stringers, which makes the manufacturing cost expensive.

If there is a ply drop-off in the longitudinal direction on the frame of the aircraft, the frames must be modified. But the size of an aircraft cabin is predetermined; the total height of the skin and the frame is therefore limited. Consequently, increasing the skin thickness necessarily means modifying the size of the frame. In particular, in the case of clipped frames (shown in FIG. 11), the geometry of the clip must be modified by reducing its height to offset the increase in skin thickness. Such a modification in the geometry of the clip has the disadvantage of not being suited for composite structures, where it is generally preferred that the attachment pieces be built in.

Indeed, on a composite structure, we are attempting to reduce to the maximum the number of attachments to be placed in the structure, since drilling is delicate, requiring special drills with very expensive diamond coatings and entailing a risk of delamination when the drill comes out and bad onboard behavior of holes for lack of plasticizing.

In a structure made of composite material, we are trying to use to the maximum integrated frames for which the clips are integrated into the frame preform. This avoids attachments between clips and frames, which gives better mechanical hold, saves weight and consequently assembly cost. These integrated frames can be F-shaped frames, as shown in FIG. 5. These F-shaped frames are generally manufactured according to RTM technology, which requires an expensive mold. Consequently, each jump in thickness on the inside of the skin entails the manufacture of a frame with different dimensions and, hence the design of a special mold to make that frame located at the jump in thickness. It follows that this technique, while powerful, requires substantial tooling costs.

Another solution could consist of designing a mold for a frame with a smaller diameter and placing a shim between the foot of the frame and the skin, when the skin is thinner. However, this solution would entail the cost of manufacturing a specific piece to brace the frame; this bracing, for a structure made of composite material, is liquid bracing that requires polymerization, which is also expensive. Such a solution would also reduce the mechanical performance of the joint, since it adds an offset of neutral fibers.

FIG. 6 shows different examples of frames for the different technologies explained above. These frames 20 are mounted on a skin 2, more or less thick, based on the examples. In particular, part A of FIG. 7 shows a frame 20a with a C-shaped profile, clipped to a thin skin 2a by means of a clip 22. Part B shows a built-in frame 20b, attached to a thin skin 2a. Part C shows a built-in frame 20c with a shim 23 between the thin skin 2a and said frame; the difference in height between this frame 20c and frame 20b is offset by the shim 23. Part D shows the integrated frame 20c attached to a thick skin 2b. These four types of frames correspond to the different embodiments described earlier.

It will be understood from the preceding that none of the current techniques makes it possible to optimize the thickness of a skin made of composite material in the longitudinal direction to absorb the flexure of the fuselage, without significantly increasing the cost of manufacturing the fuselage (either by increasing the cost of the stringers and frames, or by increasing the cost of the skin).

SUMMARY

The purpose of the disclosed embodiments is to remedy the disadvantages of the techniques described earlier. For this purpose, the disclosed embodiments propose a fuselage section made of composite material in which the internal profile of the section is constant, and the variations in thickness take place on the external profile of said section. Such a fuselage section makes it possible to optimize the thickness of the skin while limiting the manufacturing costs associated with the frames and stringers. The disclosed embodiment is based on the fact that a composite panel can have a progressive, linear change in thickness on the external profile of the section, giving said section a slightly conical exterior shape. Such a fuselage section offers a regular, constant internal profile, requiring no adjustment in thickness on the frames and/or stringers of the internal structure.

More specifically, the disclosed embodiments concern an aircraft fuselage section made of composite material having:
an internal skeleton with frames forming a radial structure of the fuselage and stringers forming a longitudinal structure of said fuselage, and
a skin made of composite material surrounding the internal skeleton, with the thickness of this skin being variable,
wherein the thickness of the fuselage skin changes along a longitudinal axis X, with an approximately constant, regular internal profile.

The fuselage section in the disclosed embodiments can have one or more of the following characteristics:
the change in thickness is linear and constant,
surplus thickness is formed on the external profile of said section,
the variation in thickness of the skin is obtained by superimposing and interlacing strips of fibers, with the number of strips varying as a function of the thickness desired.
the frames are F-shaped frames with built-in attachment clips,
the stringers are constant in height
the frames are constant in height.

The disclosed embodiments also concern a process for manufacturing the skin of an aircraft fuselage section made of composite material, having an operation for draping strips of fibers precoated with resin around a mold, wherein the number of strips of fibers varies longitudinally based on the area of the fuselage considered, so as to produce a skin whose thickness changes.

According to this process, the strips of fibers can be superimposed and interlaced.

The disclosed embodiments also concern an aircraft having at least one aircraft fuselage section like the one described above.

BRIEF DESCRIPTION OF THE DRAWINGS

FIG. 5, already described, shows a profile view of an F-shaped frame.

FIG. 6, already described, shows different types of frames with different skin thicknesses.

FIGS. 7, 8 and 9 show a fuselage panel and its profile in the case of the prior art and in the case of the disclosed embodiments, respectively.

DETAILED DESCRIPTION

The disclosed embodiments propose an aircraft fuselage section made of composite material in which the skin of the fuselage has a linear thickness that changes on its external face. The disclosed embodiments basically apply to the variation in skin thickness in the longitudinal direction, i.e. along the center axis of the aircraft, because, as explained earlier, it is in the longitudinal direction that the ply drop-off is the most difficult to produce and the most disturbing with the most consequences on the frames and stringers. In the disclosed embodiments, the thickness of the skin changes slowly, linearly, without stages, so as not to require any ply drop-off area.

Note, however, that certain plies, or jumps in thickness are necessary whatever the aircraft. In effect, certain special areas of the fuselage require jumps in thickness, like the longitudinal and circumferential joining areas and opening areas (hatches, doors, inspection ports . . . ). These jumps in thickness create a variation in thickness on the internal profile of the skin requiring the use of specific parts. These jumps in thickness are present on all aircraft, whatever the technology for manufacturing said aircraft. The disclosed embodiments, on the other hand, makes it possible to avoid the ply drop-off to make the changes in skin thickness necessary to absorb the flexural forces of the fuselage.

To do so, the disclosed embodiments propose replacing the ply drop-off areas with a continuous variation in the thickness of the skin. FIGS. 7, 8 and 9 show examples of changes in the skin thickness profile.

Figure 1:
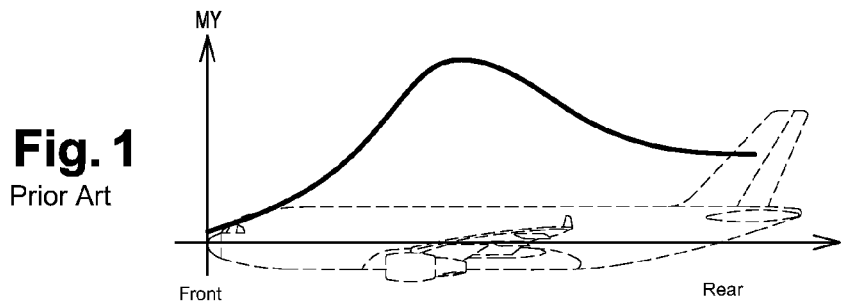
FIG. 1, already described, shows an aircraft with a profile of its flexural torque.
Figure 2:
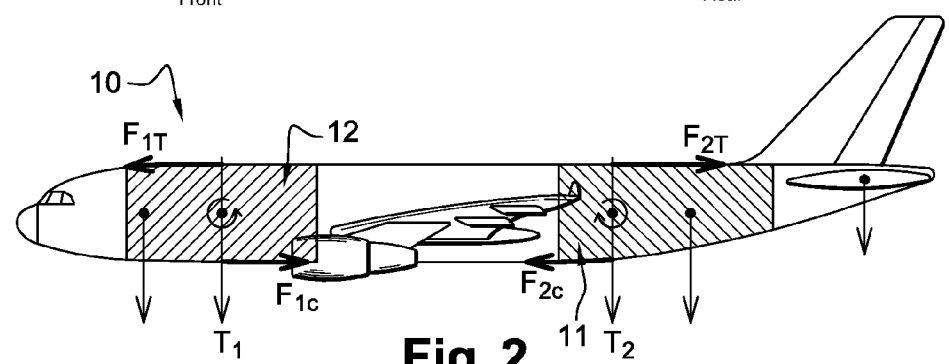
FIG. 2, already described, shows the aircraft in FIG. 1 with the forces corresponding to its flexural torque.
Figure 3:
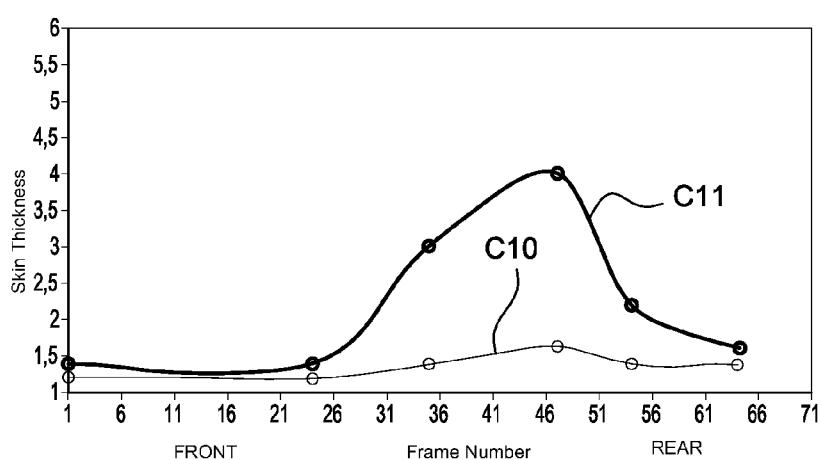
FIG. 3, already described, shows an example of changes in the thickness of an aircraft skin.
Figure 4:
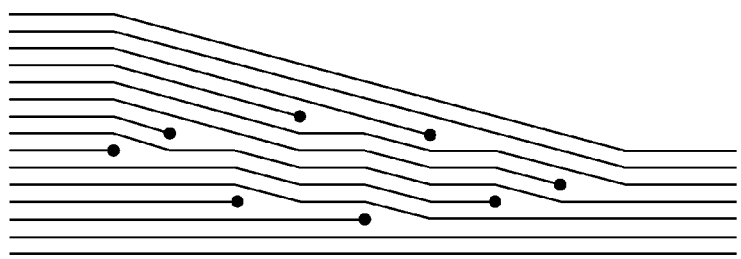
FIG. 4, already described, shows an example of a ply drop-off area.

FIG. 7 shows a schematic sectional view of a fuselage panel 3 made of composite material. On the left part 30 of this panel, which corresponds to the nose of the aircraft, the skin thickness is 1.4 mm; on the right lateral part 32 of this panel, which corresponds to the wing side of the aircraft, the skin thickness is 2.1 mm; on the edge 33 of this panel, the thickness is 3.5 mm. Making such a fuselage panel 3 of composite material requires two frame molds and two stringer molds: one frame mold for area 30, one frame mold for area 32, one stringer mold for area 30 and one stringer mold for area 32. Area 31 of this panel is a ply drop-off area for an aircraft made of traditional composite material. This ply drop-off area 31 is made using the technique explained in relation to FIG. 4.

FIG. 8 shows the profile of the skin for the panel in FIG. 7. On this profile, it can be seen that the jump in thickness is produced over a distance d, which is short in relation to the dimension of the panel. This profile also shows that the jump in thickness takes place on the internal surface of the skin.

The disclosed embodiments propose making the jump in thickness not over a distance d, as shown in FIG. 8, but over a distance D, which is very clearly greater than d, so as to permit a constant linear change in the thickness. The profile of this change in skin thickness in the disclosed embodiment is shown in FIG. 9, which shows that the variation in thickness is produced on the external surface of the skin by a relatively slow, but constant, linear change (over the entire distance D). It can also be seen that the internal surface of the skin is flat and regular.

The linear and approximately constant variation in thickness in the disclosed embodiments over a distance D that is largely greater than d, with no drop-off is called an evolving variation. Comparing FIGS. 8 and 9 reveals that in the disclosed embodiments, the changes in thickness evolve over the external surface of the skin and are not gradual, by degrees, on the internal surface, as is the case in the prior art.

This evolving variation makes it possible, on one hand, to follow the changes from the time of flexure of the fuselage and, on the other hand, to have a constant, regular internal profile along the X axis of the aircraft.

To obtain the profile in FIG. 9, a surplus thickness is produced on the external aeronautic profile of the fuselage section. This surplus thickness is obtained by draping strips of additional fibers over the fuselage section when said section is being manufactured. The strips are draped in such a way that they are superimposed and interlaced.

An evolving variation in thickness can consist of an increase in skin thickness or a reduction in said skin thickness. An increase in thickness is obtained by gradually adding plies, by interleaving one or more layers of fiber strips between the lower and upper strips. These plies are added by the technique of interlacing strips of fibers described in relation to FIG. 4. It is thus possible to increase the number of strips of fibers regularly, so that there is no drop-off on the surface of the section after polymerization of the resin. A reduction in thickness is obtained by gradually eliminating plies between the lower and upper strips, by reversing the technique that was just described to increase the thickness.

Due to its constant internal profile, with no variation in height, a fuselage section produced according to the disclosed embodiments make it possible to use stringers with a constant height. These stringers are therefore not onerous to manufacture since they are made by pultrusion. Such a fuselage section also makes it possible to use frames that are not very onerous since they are produced from a single mold.

This section offers a strictly identical cabin height, whatever area of the section is considered and whatever the thickness of the skin in the section.

On the other hand, fuselage sections produced according to the disclosed embodiments have an approximately conical external profile. In effect, since the thickness drops off on the exterior of the skin, the external shape of the section is substantially modified. Since the increase in thickness is linear and constant, the fuselage section obtained has an approximately conical external shape. However, this modification of the external profile has a small aerodynamic impact that can be considered a compromise to optimize between manufacturing simplicity and aerodynamic performance. For example, on a T13/14 section with a length from 10 to 20 interframes (i.e., 5 to 10 meters), the changes in thickness are around $^{2}/_{10}$ths, i.e., an inclination less than 0.4% (inclination of 0.004). Since this inclination is very small, it is understood that the aerodynamic impact of this inclination is also very small.

In back of section T15, the effect is even smaller since the skin gets thinner: the back of the aircraft is hidden by the front; it is therefore no longer in the air flow.

On the center section T15, the thicknesses are greater and the variation in thickness is larger. The drag impact is small.

Figure 10:
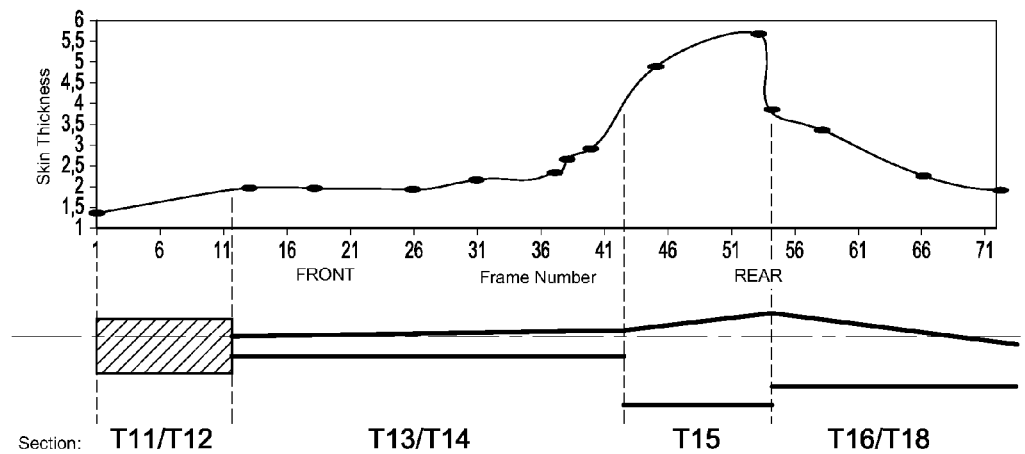
FIG. 10 shows a curve showing changes in the thickness of the bottom section of an aircraft.
Figure 11:
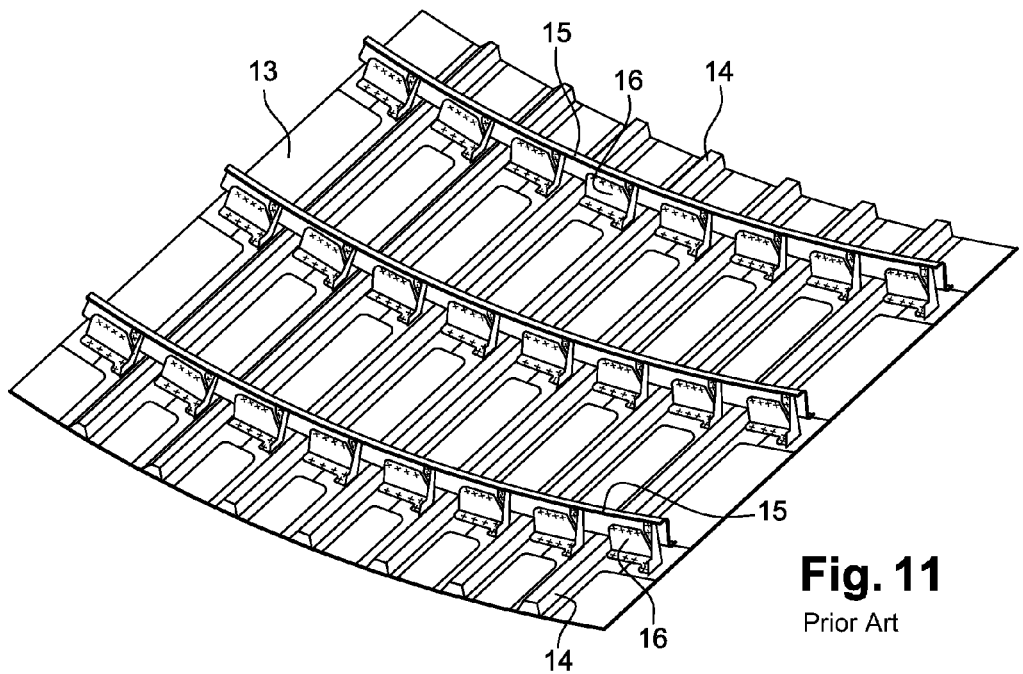
FIG. 11, already described, shows an example of a fuselage panel with stringers and frames.

FIG. 10, in the lower portion of the figure, shows an example of changes in thickness between the nose and tail of an aircraft based on section. Sections T11 and T12 correspond to the nose of the aircraft; they are therefore not concerned with the disclosed embodiments and are represented by cross-hatching Sections T13 and T14 correspond to a thin-skin area. They also correspond to an area where the thickness varies at a very small inclination as visible relative to the dashed horizontal reference line. Section T15, which is the center of the fuselage, has a very thick skin and hence a variation of thickness with a sharp inclination as visible relative to the dashed horizontal reference line. The tail sections T16 to T18 have a thick skin with a small inclination.

In all cases, the rules for the aerodynamics of a particular aircraft are followed, with a fuselage having sections that conform to the disclosed embodiments.

The technique in the disclosed embodiments has the advantage that the cost of assembling the frames is attractive, since it allows the use of F-shaped frames with built-in attachment clips, which lightens the general weight of the aircraft, simplifies the assembly phase and avoids the use of mounted elements (with their attendant attachment problems).

This technology also makes the cost of manufacturing the skin attractive, since the number of ply drop-off areas, with their difficult design rules, is reduced.

It also offers design flexibility. With the traditional concept, the final design of the skin (thickness, for example) is possible only after a number of calculating loops, with loads that change between loops. Thus, in the case of a traditional configuration, it is necessary to await the final design before ordering tools to be manufactured. With the technology in the disclosed embodiments, the latest changes in thickness can be integrated on the external plies. The tools can be purchased in advance, and the development cycles are shortened.

The invention claimed is:

1. An aircraft fuselage section having a longitudinal joining area at each end of the section for joining the fuselage section to another fuselage section and made of composite material comprising:
   an internal skeleton with a plurality of frames forming a radial structure of the fuselage section and stringers forming a longitudinal structure of said fuselage section, and
   a skin made of composite material surrounding the internal skeleton, the skin having an internal and an external profile, with the internal skeleton abuttingly engaging the internal profile of the skin and said skin having a variable thickness as measured between the internal and external profiles,
   the fuselage section having a longitudinal length extending along a longitudinal axis of the fuselage section between the longitudinal joining areas, the external profile having a constant linear change along the longitudinal length of the fuselage section between the longitudinal joining areas, and the internal profile being constant along the longitudinal axis of the fuselage section for the longitudinal length of the fuselage section between the longitudinal joining areas,
   wherein the internal and external profiles define a conical exterior shape of the skin.

2. The aircraft fuselage section in claim 1, wherein the variation in skin thickness is obtained by superimposing and interlacing strips of fibers, with the number of strips varying as a function of the desired thickness.

3. The aircraft fuselage section in claim 1, wherein the frames are F-shaped frames with built-in attachment clips.

4. The aircraft fuselage section in claim 1, wherein the stringers are constant in height.

5. The aircraft fuselage section in claim 1, wherein the frames are constant in height.

6. An aircraft comprising at least one fuselage section made of composite material according to claim 1.

7. The aircraft fuselage section in claim 1, wherein the internal profile is constant along the longitudinal axis of the fuselage section for the entire longitudinal length of the fuselage section between the longitudinal joining areas and excluding any opening areas in the fuselage section.

8. The aircraft fuselage section in claim 7, wherein the opening areas are selected from a group consisting of hatches, doors and inspection ports.

* * * * *